April 18, 1961    O. R. ETHERIDGE    2,980,576
METHOD OF COOKING STARCH
Original Filed Feb. 24, 1954    5 Sheets-Sheet 1
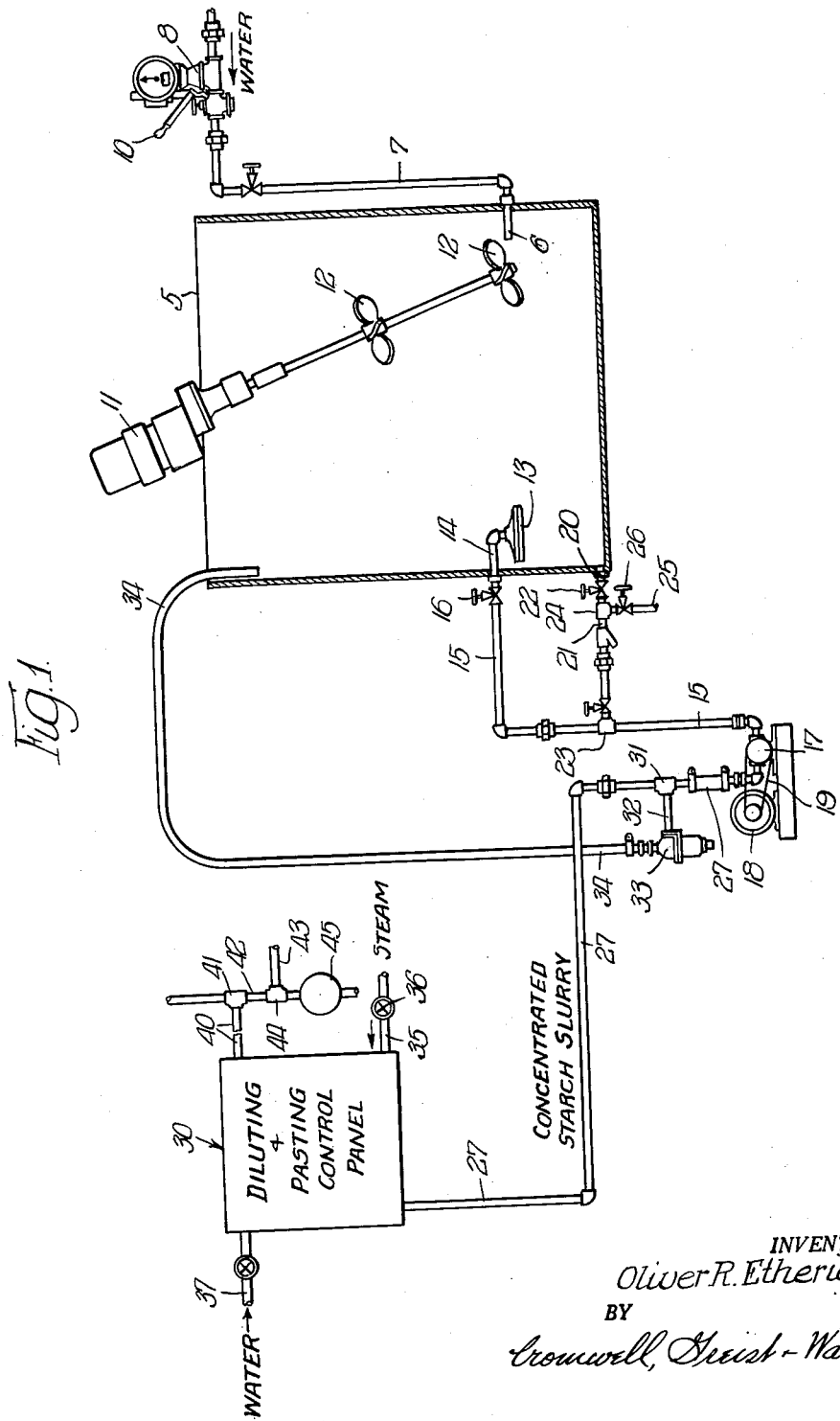
INVENTOR.
Oliver R. Etheridge,
BY
Cromwell, Greist-Warden
Attys

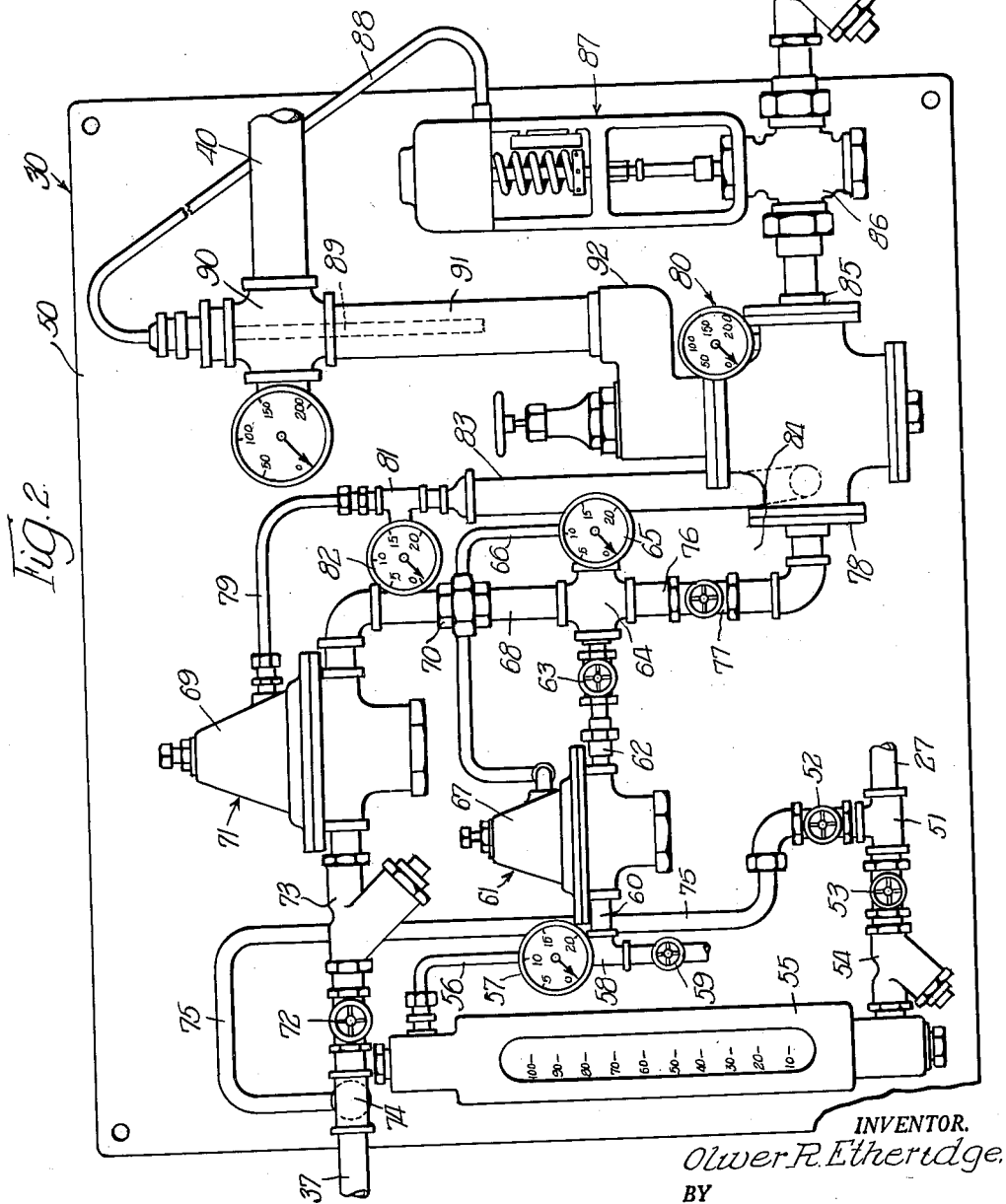

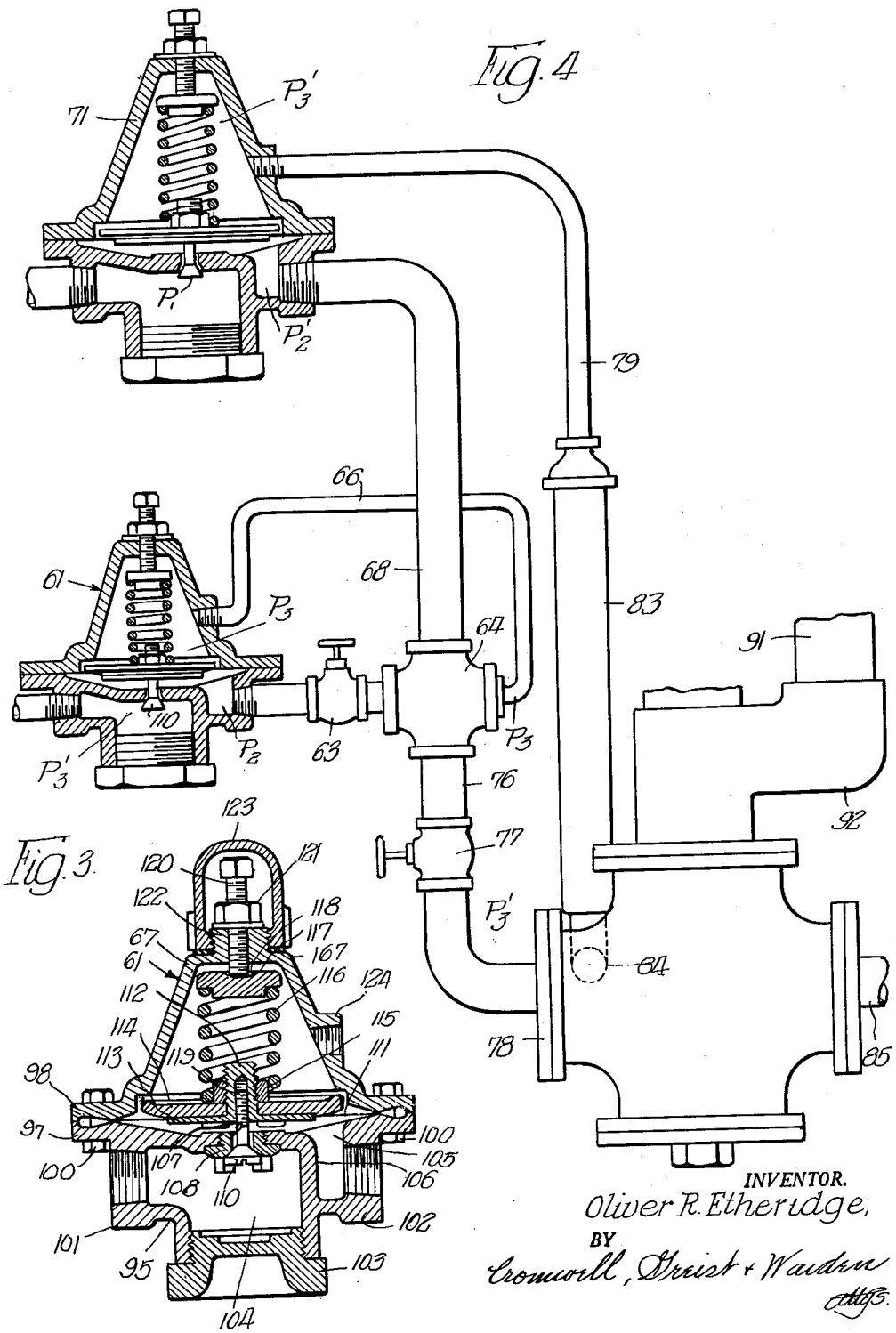

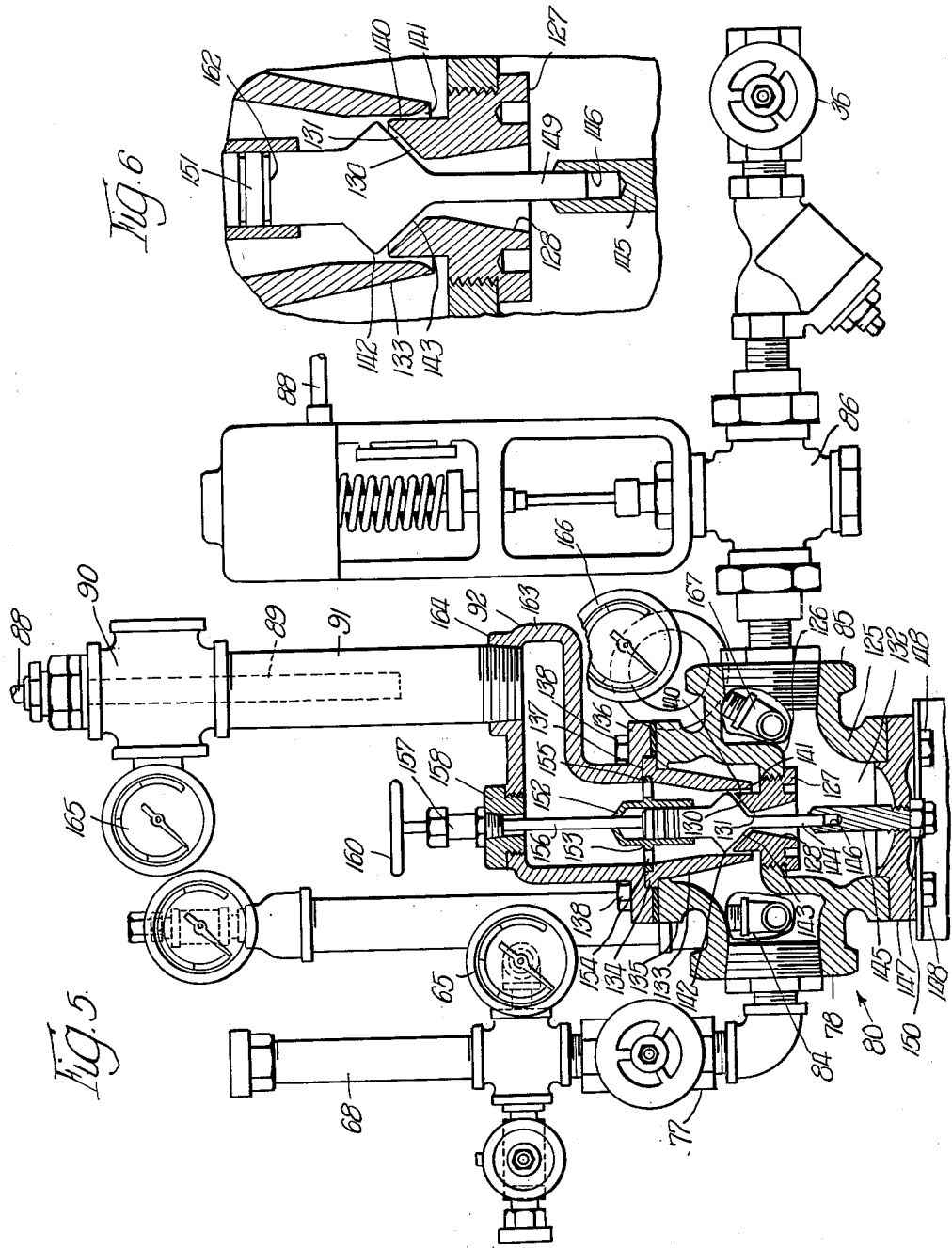

April 18, 1961     O. R. ETHERIDGE     2,980,576
METHOD OF COOKING STARCH
Original Filed Feb. 24, 1954     5 Sheets-Sheet 5
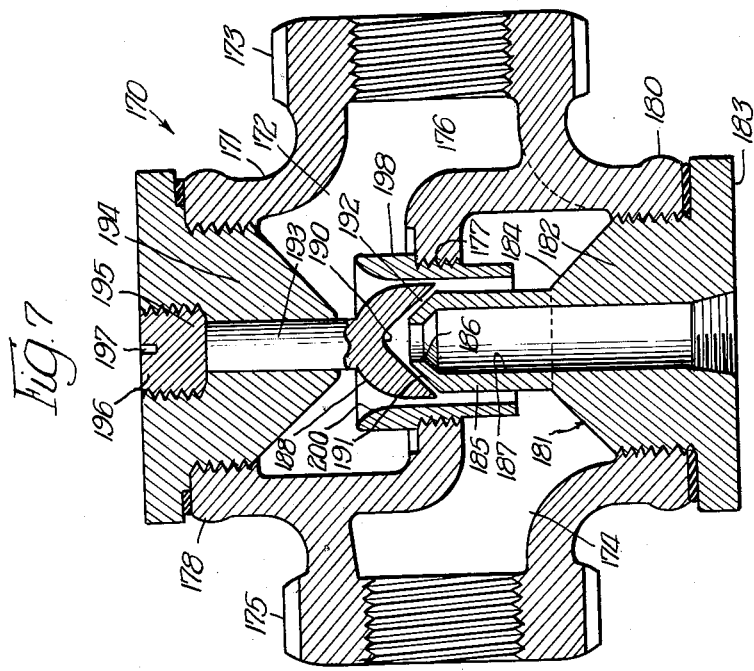
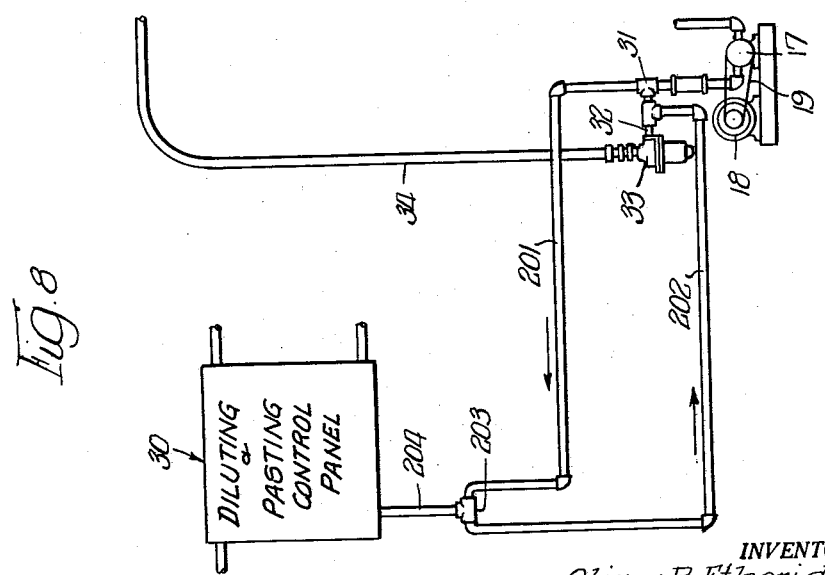
INVENTOR.
Oliver R. Etheridge,
BY
Cromwell, Greist + Warden
attys.

2,980,576

METHOD OF COOKING STARCH

Oliver R. Etheridge, Decatur, Ill., assignor to A. E. Staley Manufacturing Company, Decatur, Ill., a corporation of Delaware Original application Feb. 24, 1954, Ser. No. 412,219. Divided and this application Jan. 30, 1958, Ser. No. 713,078

7 Claims. (Cl. 162—175)

The present invention relates, broadly, to innovations and improvements in methods of and apparatus for preparing starch slurries and continuously pasting or cooking the same. The invention relates particularly, to the advantageous utilization of such innovations and improvements in connection with the manufacture of paper and similar water-laid webs and sheets such as, paper board, fiber board, chip board, insulating board, and molded fibrous products. Hereinafter, the terms "paper" or "paper-making" are intended to include and refer to these related paper products broadly, as well as to paper itself.

This application is a division of co-pending application Serial No. 412,219 filed February 24, 1954.

Starch is used industrially in large quantities for many purposes. For example, large quantities of starch are used in the manufacture of paper and related products, textiles, laminated products, confections, adhesives, and many other products. In order to use starch for these and other purposes, it is generally necessary to prepare aqueous starch pastes from dry starch.

In general, the preparation of starch pastes industrially has been an objectionable procedure. It is usually not economical to ship starch commercially except in the dry powder form, either in bags or bulk. Therefore, industrial users, receiving the starch in that form, must work out some means and technique for slurrying the starch in water and thereafter pasting the starch slurry. For lack of any better equipment and methods, industrial users generally resort to a batch technique wherein dry starch is slurried in a tank of water and then the slurry is pasted either in this same tank or in a separate tank provided with suitable heating means. In order to keep the size of the equipment small and reduce the bulk of material handled as much as possible, the batches of starch are normally cooked at relatively high concentrations. It is inherently difficult to paste starch uniformly and accurately in such concentrated batches and especially to avoid formation of flecks and lumps which are difficult to disperse or remove. Fairly good uniformity may be obtained if the starch is heated to high pasting temperatures for substantial periods so as to fully and completely paste the starch. However, good uniformity cannot be obtained in batch processing techniques if the starch is only mildly or incompletely pasted or cooked. In the latter case some of the starch granules will be undercooked, some over-cooked and only a small fraction will be properly pasted. At best, only a rough average treatment can be obtained.

While various forms of continuous starch cookers or pasters have been proposed by others, none of these appears to have proven satisfactory except, perhaps, for special purposes. Furthermore, the actual pasting or cooking operation itself is only one of several difficulties involved in preparing starch pastes from dry starch, and there has been a failure to provide and integrate a satisfactory continuous starch cooker or pasting device with other suitable equipment for slurrying the dry starch and delivering or feeding the starch slurry in proper dilution and volume to a continuous cooker or paster capable of properly handling the same.

In accordance with the present invention, there has been provided an integrated system and process for first preparing highly concentrated starch slurries, continuously diluting the concentrated slurries, and then continuously cooking or pasting the starch with steam while in dilute form. The integrated system and process provided by this invention, while generally useful for many purposes, is particularly useful in the manufacture of paper since it operates to deliver a constant (but easily regulatable) volume of starch which is uniformly and controllably pasted or cooked to the desired degree while in the proper dilution and which is free of flecks or undispersed particles of starch.

The invention involves both method and apparatus innovations as will be fully explained in the detailed description set forth hereinafter in connection with the drawings.

An important object of the invention is an integrated apparatus and process wherein dry starch is slurried in a relatively concentrated condition and the concentrated starch slurry is continuously diluted with water and then introduced into a continuous jet cooker wherein it is uniformly pasted or cooked with steam to the desired degree.

An important object of the invention is an easily controlled and integrated system and process for continuously pasting or cooking starch wherein, except for a supply of concentrated starch slurry, there is a minimum of starch in process at any one time and yet the system is capable of delivering large volumes of uniformly pasted or cooked starch.

An important object of the invention is a method and apparatus for conveniently preparing and thereafter maintaining a body of starch slurry having a predetermined and uniform concentration throughout wherein relatively small and standardized increments of starch and water are concurrently added and the body of starch is thoroughly agitated.

An important object of the invention is an apparatus for and method of continuously pasting a stream of starch using the high velocity impact effect of steam wherein the pasting time is practically instantaneous and the pasting process and quality of the resulting paste can be controlled by temperature regulation alone.

An important object of the invention is the provision of improved apparatus for preparing starch paste which includes slurrying means for preparing a uniform, relatively concentrated, starch slurry and a hydraulically balanced diluting means operative to continuously take in the concentrated starch slurry and water in predetermined proportions and deliver diluted starch slurry at a constant volume into a continuous starch paster or cooker wherein it may be very accurately and uniformly pasted with steam to the desired degree.

Another important object of the invention is a method of and apparatus for preparing starch paste starting with dry starch and water, which do not involve the use of holding or retaining tanks or pipe enlargements other than the tank or tanks which serve as the source of supply of the unpasted starch slurry and wherein there are continuous, systematic, and uniform flow streams of undiluted starch slurry, diluted starch slurry and pasted starch slurry, with the result that substantially all granules of starch undergo the same cycle and receive the same treatment.

Another important object of the invention is a compact, self-contained unit having inlet connections for concentrated starch slurry, water and steam, and an outlet connection for pasted or cooked starch which unit upon being pre-set as desired operates automatically to dilute the concentrated starch slurry to a predetermined degree and to automatically cook or paste the diluted slurry to the desired degree and deliver a constant volume thereof.

Another important object of the invention is a hydraulic mixer and method of operating the same in which each one of a pair of pressure reducing and regulating valves or differential pressure regulators is connected hydraulically with one of a pair of metering orifices to provide a balanced and interconnected diluting unit which operates automatically to receive a concentrated starch slurry, the flow of which may vary or be varied, and to take in and mix therewith sufficient water to make up a predetermined constant volume of diluted starch slurry.

Another important object of the invention is a method of and means for the rapid and sensitive control of a paper-making machine and process, and also the paper produced therein, by controllably pasting a stream of starch primarily by temperature regulation.

Another important object of the invention is to continuously paste a uniform stream of starch to an accurate and predetermined degree, primarily as the result of high velocity impact effect of steam, and then immediately introduce the resulting stream of pasted starch of controlled and uniform quality into a paper-making machine and process at a location downstream from stock-refining equipment and action so as to quench the starch, arrest the cooking action, and minimize retrogradation and mechanical break-down, with total heat cycle not exceeding about 10 seconds.

Another important object of the invention is a starch pasting system (i.e. method and apparatus) for use in connection with paper-making machines, which operates automatically to continuously produce from dry starch and water and to deliver to a paper machine, highly dilute starch paste wherein the starch granules are uniformly pasted to the desired degree.

Still another important object of the invention is the provision of improved devices for continuously cooking starch with steam in a very uniform manner, in a very short time, and wherein the modification of the starch is controlled by regulating the temperature.

Certain other objects of the invention will, in part, be obvious and will, in part, appear hereinafter.

For a more complete understanding of the nature and scope of the invention, reference may now be had to the following detailed description thereof taken in connection with the accompanying drawings, wherein:

Fig. 1 is a diagrammatic view of an integrated system, constituting one embodiment of the invention, for transforming dry starch into a continuously formed stream of pasted or cooked starch for delivery to a paper machine;

Fig. 2 is an elevational view of the control unit which constitutes an important part of the apparatus shown in Fig. 1 and which operates to receive steam, concentrated starch slurry and water and to continuously combine these incoming materials in a regulatable and uniformly controlled manner so as to produce a regulated volume and quality of dilute pasted or cooked starch;

Fig. 3 is an enlarged vertical sectional view through one of the two pressure reducing and regulating valves constituting elements of the control unit shown in Fig. 2;

Fig. 4 is a diagrammatic view illustrating the manner in which two of the pressure reducing and regulating valve units shown in Fig. 3 are hydraulically interconnected in the control unit shown in Fig. 2 with a pair of flow regulating valves providing metering orifices, so as to deliver the constant supply or volume of starch slurry to the starch cooker or paster shown in Fig. 5;

Fig. 5 is an enlarged elevational view, partly in vertical section and partly broken away, showing the continuous starch cooker and paster and related control apparatus which forms an important part of the control unit shown in Fig. 2;

Fig. 6 is a fragmentary, detail view on enlarged scale showing the interior of the continuous starch cooker and paster shown in Fig. 5;

Fig. 7 is a sectional view, certain parts being shown in elevation, of a continuous starch cooker which may be used in the control unit shown in Fig. 2 and which forms another embodiment of the invention; and Fig. 8 is a diagrammatic view of a recirculating system for delivering concentrated starch slurry to the control unit in place of the single line system shown in Fig. 1.

In Fig. 1 the reference numeral 5 designates a starch slurry tank which may serve as the supply source of or bank for concentrated starch slurry. Preferably, the tank 5 is located in or near the starch storeroom thereby minimizing the handling of the starch and making it possible to confine the dry, powdery starch to a single location where it does not interfere with other manufacturing operations. This arrangement also minimizes the housekeeping problem and increases plant safety.

The size of the slurry tank 5 will depend upon the capacity of each installation and upon the particular manner of operation in any one plant. For example, it may be desired to have the tank 5 large enough so that a quantity of starch slurry can be made up at the beginning of a shift or beginning of the day which will be sufficient to fill the requirements of an entire shift or day's operation. On the other hand, the tank may be designed on the basis that it will be attended by an operator who will keep the tank supplied with starch and water so that the level of the slurry therein does not drop below a predetermined level. Usually, the tank 5 will have a capacity ranging between 300 to 1000 gallons.

The dry starch may be conveniently introduced into the tank 5 by emptying in 100 or 150 pound sacks of starch if it is purchased in bags. If purchased in the bulk, then a standard amount of the starch may be measured out into a standard container and this operation may be facilitated by the use of automatic scales of known type.

The water is introduced into the bottom portion of the tank 5 through a water inlet nipple 6 which is connected outside of the tank with a water supply line 7. For convenience and accuracy of operation, the supply line 7 is provided with a trip type of water meter-valve 8 of known type which operates to permit a predetermined and pre-set quantity of water to flow through the meter-valve 8 each time it is tripped by operating the handle 10. For example, to make up a starch slurry containing 2.5 pounds of starch per gallon the meter-valve 8 may be set to deliver 30 gallons of water each time a 100 lb. bag of starch is emptied into the tank 5. The meter-valve 8 may be set to run in each increment of water in approximately the time required for the starch to disperse, e.g. 1½ minutes. In this way the contents of the tank 5 are maintained uniform even during starch and water additions.

With this arrangement for adding starch and water, the attendant merely has to trip the meter-valve 8 and then empty a bag of starch into the tank 5, and repeat this operation as often as is necessary to maintain the level of the starch slurry above a predetermined point. In this way, there will always be maintained in the tank 5 a sufficient body or "cushion" of starch slurry so that there is no appreciable change in the concentration when each increment of starch and water is added. By employing such a high concentration, the maximum benefit is derived from the volume of the tank 5 in the way of starch slurry capacity or "cushion" and a minimum of energy and time are required to mix the slurry and maintain it in uniform concentration throughout.

The slurry tank 5 should be provided with an efficient type of agitator such, for example, as a portable agitator 11 of known type which may be clamped onto the side of the tank with the agitator blades 12—12 projecting down into the tank 5 where they will effectively agitate the contents of the tank and insure rapid and uniform mixing of additional quantities of water and dry starch as they are added. The lower paddle blade or agitator blade 12 is preferably located adjacent the raw water inlet.

Normally, the starch slurry will be withdrawn from the tank 5 at a location where the contents of the tank tend to have greatest uniformity. Usually, this will be at a location approximately diametrically opposite the water inlet and one-quarter to one-third the height of the tank 5 to avoid short circuiting. It will be noted that there is provided at such a location an intake strainer 13 connected to a nipple 14 projecting through the side wall of the tank 5 and connecting exteriorly thereof with a starch slurry draw-off line 15 which is provided with a valve 16. The slurry line 15 is connected to the inlet of a slurry pump 17 of known type capable of delivering a relatively constant volume of slurry when driven at a uniform speed. The pump 17 may be driven by an electric motor 18 through a belt drive 19.

In order that the starch slurry may be drained from the tank 5 when desired and emptied when the level drops below the tank strainer 13, an outlet nipple 20 is provided in the bottom of the tank 5 which connects with a line 21 provided with a valve 22 and a T 23 at the outer end by which the line 21 is connected with the line 15. Preferably, the line 21 is also provided with another T 24 adjacent the valve 22 so that the contents of the tank 5 may be discharged to a drain line 25 provided with a valve 26.

The discharge connection of the pump 17 is connected with a slurry line 27 which runs to the system control panel which is indicated and designated generally at 30. Since only one pipe line 27 is involved in conveying the starch slurry, the control panel 30 usually may be located at any desired place in the plant while the slurry tank 5 and pump 17 and related parts are located in or near the starch storeroom. Usually, the control panel 30 will be located adjacent the place where the manufacturing operation is going on which requires the pasted starch slurry.

Advantageously, the slurry line 27 is provided with a T 31 adjacent the pump 16 from which extends a nipple 32 leading to a pressure relief valve 33 of known type. A discharge connection from this pressure relief valve 33 is connected with a pipe 34 which discharges into the top of the slurry tank 5. With this arrangement, if the discharge of concentrated starch slurry from the pump 16 exceeds the requirements of the control panel unit 30, the excess is automatically by-passed and returned to the slurry tank 5.

A recirculatory system for delivering the concentrated starch slurry to the control panel unit 30 may be used as will be described below in connection with Fig. 8.

The details of construction and operation of the control panel unit 30 will be described in detail below in connection with Figs. 2 through 5. This unit is connected not only with the slurry line 27 which delivers concentrated slurry to it but also with a steam line 35 provided with a valve 36 and a water line 37. The control panel unit 30 receives the concentrated starch, water and steam and operates to automatically combine and process these three materials so as to produce a constant predetermined volume of uniformly pasted or cooked dilute starch solution which is discharged from the control panel unit 30 through a discharge line 40.

The pasted or cooked starch may be delivered to any desired process or use such, for example, as to a Fourdrinier paper machine or a single or multiple cylinder paper-making machine. Preferably the starch is introduced downstream of the refining equipment such as the beaters, hydro-pulpers, Bauers and Jordans. For purposes of illustration, the delivery of the pasted or cooked starch solution to a paper machine is represented diagrammatically in Fig. 1. Thus, the line 40 connects with a T 41 in the white water line 42 of a paper machine. The furnish is introduced from line 43 through a T 44 between the T 41 and the fan pump 45. The fan pump serves to blend the white water, starch solution and furnish and deliver the same to the head box of the paper machine.

*Control panel unit*

Referring to Fig. 2, the control panel unit 30 comprises a panel 50 of suitable dimensions on which the various parts are mounted by suitable means. The concentrated starch line 27, steam line 35, water line 37, and starch paste discharge line 40 are disposed around the panel 50 in a relationship corresponding to that shown in Fig. 1. The concentrated starch slurry line 27 comes into a T 51, the side connection of which is connected with a flush valve 52 and the in-line connection of which is connected with a shut-off valve 53. A strainer 54 is connected between the valve 53 and the inlet into the bottom of a flow-rate indicator 55 of known type. The outlet connection at the top of the flow-rate indicator 55 is connected to a line 56 which is provided with a pressure gauge 57 and which leads to a T 58, the side connection of which is connected by means of a nipple 60 to the inlet of a differential pressure flow control valve 61 of known type. The construction of this valve unit will be described in detail below in connection with Fig. 3.

The outlet connection of the valve 61 is connected to a union 62 which connects with a variable orifice flow regulating valve 63 of known type wherein the size of the orifice can be adjusted within the desired limits. The discharge side of the flow regulating valve 63 for the concentrated starch slurry connects with one of the side connections of a cross-fitting 64. The opposite side connection of the fitting 64 is connected to a pressure gauge 65 and a pressure transmitting line 66 which connects with the bonnet 67 of the valve 61.

The upper connection of the cross-fitting 64 is connected with a water line 68 having a union 70. This water line 68 extends from the outlet connection of a second differential pressure flow control valve 71 which may be of the same construction as the valve 61, but larger. The inlet connection of the valve 71 is connected to the water line 37 which is provided with a shut-off valve 72 and a strainer 73. There is also a T 74 in the water line 37 upstream of the valve 72 to the side connection of which a flush line 75 is connected which runs down to the flush-out valve 52.

The bottom connection of the T 64 is connected with a dilute starch slurry line 76 having therein a variable orifice flow regulating valve 77 which may be of the same type as the flow regulating valve 63 and of suitable size. The line 76 below the valve 77 leads into and is connected with the inlet connection 78 of a continuous type steam jet cooker indicated generally at 80. This device will be described in detail in connection with Fig. 5 of the drawings.

The hydraulic pressure in the dilute starch slurry line 76 is communicated to the bonnet 69 of the control valve 71 through a pressure transmitting line 79 provided with a T 81, the side connection of which is provided with a pressure gauge 82 and the bottom connection of which is connected to the upper end of a settling chamber 83. The bottom end of the settling chamber 83 is connected to an opening in the body of the starch cooker 80 by means of a nipple 84 (Fig. 5) on the back side thereof. The purpose of the chamber 83 is to permit the starch to settle therein so that only clear water is communicated to the bonnet 69 of the valve 71.

A second inlet connection of the jet cooker 80 is indicated at 85 and this connection receives steam from the steam line 35 after it first passes through a steam regulating valve 86 of known design which is thermostatically controlled by a thermostat 87.

The thermostat 87 is actuated by expandable fluid contained in a line 88 of the bulb element 89 of which projects down through a cross-fitting 90 connected with the upper end of a discharge nipple 91 leading from the discharge fitting 92 of the jet cooker 80.

While the two differential pressure flow control valves 61 and 71 may be of known commercial design, they are combined in a hydraulic circuit relationship in such a way as to combine the flow streams of concentrated starch slurry from line 27 and water from line 37 and deliver a predetermined constant volume of dilute starch slurry to the jet cooker 80. The arrangement is such that the flow of dilute starch remains substantially constant despite any variations in flow of the concentrated starch slurry. Thus, if a predetermined flow of diluted starch slurry of, say, ten gallons per minute is desired and the variable orifice flow regulating valve 77 is so set, then if the intake of concentrated starch slurry is set at one gallon per minute by setting the flow regulating valve 63, the hydraulic circuit will automatically operate to admit nine gallons of water per minute. If the variable orifice of valve 63 is set so that two gallons per minute of the concentrated starch slurry passes therethrough, then the hydraulic system automatically reduces the flow of diluting water to eight gallons per minute.

In Fig. 3 of the drawings, showing a detailed vertical sectional view through the differential pressure flow control valve 61, the reference numeral 95 designates the valve body or casting of the valve. The valve body 95 and the bonnet 67 have mating flanges 97 and 98, respectively, which are secured together by means of a plurality of bolts 100—100. The valve body 95 has an inlet connection 101 and a discharge or outlet connection 102, each of which is internally threaded for receiving the end of a pipe nipple. The valve body 95 is also provided with a bottom opening which is closed by a plug cap 103.

The interior of the valve body 95 is partitioned into an inlet chamber 104 and an outlet chamber 105 by means of an integrally formed baffle or partition 106 having a horizontal portion provided with a valve port insert 107, the bottom of which has a tapered valve seat 108 for receiving a valve member 110.

The outlet chamber 105 and the top of the valve body 95 are closed by means of a differential pressure diaphragm 111 which is clamped between the flanges 97 and 98, as shown. There is an aperture in the center of the diaphragm 111 which receives a stud 112 which projects upwardly from a bottom washer or disk 113. An upper washer or disk 114 rests on top of the diaphragm and fits over the stud 112. The washers or disks 113 and 114 are drawn together so as to clamp the diaphragm 111 therebetween by means of a nut 115 which is screwed onto the stud 112 and tightened down onto the disk 114.

The bottom end of a cylindrical coil spring 116 fits over the nut 115 and bears down on top of the washer 114. The upper end of the spring 116 is engaged by a button 117 having a recess 118 in the top thereof for receiving the bottom end of an adjusting screw 120. The bonnet 67 encloses the spring 116 and the upper portion of the diaphragm assembly. The adjusting screw 120 extends down through a tapped opening provided in the top of the bonnet 67. A lock nut 121 is provided for locking the adjusting screw 120 in any particular setting. For example, the setting may be such that the valve 61 will operate on a differential in pressure of two to three pounds per square inch. The top of the bonnet 67 is provided with an exteriorly threaded boss 122 over which is screwed a cap 123.

The bonnet 67 has an integrally formed connection 124 in the side thereof which is interiorly threaded so that hydraulic pressure in the line 66 can be communicated into the interior of the housing or bonnet 67 as will be explained in connection with Fig. 5.

The valve member 110 carries an upwardly extending threaded stem 119 which screws into a tapped hole provided therefor in the stud 112, thereby connecting the valve member 110 with the diaphragm 111.

The differential pressure flow control valve 71 has the same construction as does the unit 61 but is larger since the volume of diluting water is several times greater than the volume of concentrated starch slurry.

The differential pressure flow control valves 61 and 71 and the variable orifice flow regulating valves 63 and 77 may be obtained commercially but the precaution should be taken to specify spring and valve sizes to give sufficiently low differential pressures across the flow regulating orifices in valves 63 and 77 and to maintain such differential pressures relatively free of change due to variations in either input or discharge pressures.

Flow control of equal magnitude can be obtained either by (1) high differential pressures and small orifices or (2) low differential pressures and large orifices. The second arrangement is employed since large orifices in the flow regulating valves 63 and 77, particularly valve 63, prevent solids from clogging the valves and thereby changing the flow rate in an unwanted and uncontrollable manner.

*Hydraulic diluting circuit*

Referring to Fig. 4 which illustrates diagrammatically the manner in which the differential pressure flow control valves 61 and 71 are combined in a particular hydraulic circuit relationship, it will be noted that the concentrated starch slurry is introduced into the chamber 104 of the unit 61 at a pressure of $P_1$. The valve member 110 will normally be open or unseated from the valve seat 108 so as to allow the concentrated starch slurry to flow through the valve port 107 into the outer chamber 105. Because of the constriction offered by the passage between the valve port 107 and valve member 110, the pressure within the upper chamber 105, which acts on the underside of the diaphragm 111, will be less than the pressure $P_1$ and this reduced pressure is indicated as $P_2$.

After leaving the outlet chamber 105 through the outlet connection 102, the concentrated starch slurry passes through the flow control valve 63, the variable orifice of which is regulated as desired. There is a pressure drop across the orifice in the valve 63 and the reduced pressure on the downstream side of the orifice is indicated at $P_3$. The pipe 66 serves to communicate this $P_3$ to the interior of the valve bonnet 67 so that pressure $P_3$ acts upon the upper side of the diaphragm 111.

It will be seen that the pressure $P_2$ acting on the underside of the diaphragm 111 is opposed by the pressure $P_3$ acting on the top of the diaphragm plus the force of the compression spring 116 which also acts on the upper side of the diaphragm. The relationship which exists between the pressures acting on opposite sides of the diaphragm 111 may be expressed by the following equation where A is the effective area of the diaphragm:

(1) $$P_2 = P_3 + S/A$$

or (2) $$P_2 - P_3 = S/A$$

It will be seen that $P_2 - P_3$ also equals the pressure drop $\Delta P$ across the orifice in the valve 63. It will also be seen that for any particular setting of the spring 116 the value of $S/A$ will be constant K. Therefore, Equation 2 may be rewritten as:

(3) $$\Delta P = K$$

Since the flow rate through the valve 63 is directly proportional to the drop in pressure $\Delta P$, the combination of the differential pressure flow control valve 61 and the variable orifice flow regulating valve 63 operate in combination to deliver into cross 64 and line 76 a constant volume of the concentrated starch slurry for any particular setting of the valve 63 despite variations in pressures $P_1$, $P_2$ and $P_3$.

The constant (but regulatable) flow stream of concentrated starch slurry delivered into the cross 64 combines with the stream of diluting water entering the fitting 64 from the line 68. The combined streams form a stream of dilute starch slurry which flows through the flow regulating valve 77 and to the cooker 80. The combination of the differential pressure flow control valve 71 and the variable orifice flow regulating valve 77 acts in the same manner as described above for the combination of valves 61 and 63. That is, for any particular setting of the orifice in the valve 77 there will be a constant pressure drop ΔP'. The equations for the combination of the valves 71 and 77 may be written as follows, the respective pressures being designated on Fig. 4:

(1) $P_2' = P_3' + S'/A'$ (2) $P_2' - P_3' = S'/A'$ (3) $\Delta P' = K'$

It will be seen that the hydraulic system comprising the valves 61, 63, 71 and 77 interconnected as shown in Fig. 4 operates as a unit to deliver any desired constant volume of dilute starch slurry to the cooker 80 with the volume being regulated by the setting of valve 77. The strength of this dilute starch slurry is readily controlled by the setting of the valve 63 and the system operates automatically to increase or decrease the volume of diluting water as required.

Continuous cooker

Preferably, the continuous jet cooker 80 is of the type in which a thin annular or tubular stream of dilute starch slurry (e.g. ½ lb. or less starch per gallon) is impacted from the interior by a rapidly expanding, high velocity flat or cone-shaped jet of steam and the individual starch granules or cells are controllably cooked to the desired degree in a very uniform manner and in a very short time (e.g. a fraction of a second). A continuous type cooker and method of cooking starch in accordance with these principles is shown and described in my copending application Serial No. 337,860, filed February 19, 1953, of which the present application is a continuation-in-part. The continuous jet cooker 80 is in certain respects an improvement over the one disclosed in application Serial No. 337,860.

While the degree of pasting or heat-modification of starch is, generally, proportional to time and temperature, the action of the cooker 80 is extremely fast and has a short and uniform time factor, thus allowing effective process control through temperature regulation alone.

Referring to Figs. 5 and 6 of the drawings, the continuous jet cooker 80 comprises a cooker body 125 which may be the valve body of a commercial type globe valve.

The partition wall or baffle 126 on the interior of the valve body 125 has a horizontal portion which normally carries an insert providing the valve port. In the cooker 80, the horizontal portion of the baffle or wall 126 is provided with an insert 127 which is screwed into place as shown and which is provided with a Venturi-shaped throat comprising a long tapered portion 128 and a short abrupt tapered portion 130. The tapered portions 128 and 130 join at a throat constriction which is designated at 131. The steam is introduced into the lower compartment 132 of the cooker body 125 and passes up through the Venturi opening in the insert 127 and out into the interior of a flow tube 133.

The flow tube 133 is supported from the top opening in the cooker body 125 by a laterally extending circumferential flange 134 which rests on the flat top surface of the circular mouth 135 of the cooker body 125. The top opening into the cooker body 125 is closed by a cooker outlet casing or fixture 92 having a circular flange 136 at the bottom which fits over the top of the mouth 135. On the interior the flange 136 is provided with a circular notch or recess 137 which receives the flange 134 of the nozzle member 133. The fitting 92 is retained in place on the cooker body 125 by means of a plurality of bolts 138—138 extending through the flange 136 and down into the mouth 135.

It will be seen that the interior of the nozzle member 133 is gradually flared outwardly from the bottom to the top with the bottom end thereof fitting around the insert 127 in spaced relationship thereto so as to define a narrow annular passageway indicated at 140. The bottom edge of the nozzle member 133 is tapered or cut away so as to provide a widened inlet 141 into the narrow passageway 140.

The opening 130 in the insert 127 is adjustably closed by means of a nozzle plug 142 having a tapered portion 143 which mates with the tapered throat portion 130 so as to provide the outwardly expanding, conical-shaped nozzle outlet opening 131. In Fig. 6 the taper of the conical opening 131 is 45° and in normal operation the jet of steam expanding therethrough creates a suction of about 2 lbs./sq. in. in the passage 140. If the taper of the jet opening 131 is increased to 90° (i.e. a flat disk) as in the case of the jet cooker shown in application Serial No. 337,860, there will be a back pressure in the passage 140 of about 10 lbs./sq. in.

The nozzle plug 142 has a depending support and centering pin portion 144 which projects downwardly through the insert 127 and into the upper end of a supporting post 145 having a smooth coaxial hole 146 formed in the upper end thereof in which the bottom end of the stem 144 is slidable.

The supporting post 144 is threaded on the bottom end and is screwed into a center opening provided in a closure cap 147 which is bolted over the lower opening into the cooker body 125 by means of a plurality of bolts 148—148. The post 145 has a hex head 150.

The upper end 151 of the nozzle plug 142 is in the form of a piston and projects coaxially into an inverted cup member 152 which is supported in place by means of an apertured flange or spider 153 provided with a series of ports 154. The outer edge of the flange 153 rests in a recess or groove 155 formed in the upper edge of the nozzle member 133 and is retained in place by means of an opposing portion of the bottom end 133 of the cooker outlet fixture 92.

The cup member 152 is provided with a central opening in the cover portion thereof through which projects a stem 156 projecting downwardly through a suitably packed thimble 157 which is screwed into the opening provided therefor in an adapter 158 screwed into the top of the outlet fixture 92. The stem 156 is coaxially aligned with the longitudinal axis of the nozzle plug 142 as well as with the longitudinal axis of the bottom support post 145. The upper end of the stem 156 is threaded where it passes through the thimble 157 and the projecting end of the stem 156 has a hand wheel 160 by which it may be turned so as to raise or lower the bottom end to the desired extent. It will be seen that the distance to which the nozzle plug member 142 is allowed to rise, and thereby the width of the nozzle outlet opening 131, is controlled by the setting of the bottom end of the stem 156.

The nozzle plug member 142 is slidably supported and guided at the bottom end by means of the post 145 and at the top by means of the inverted cup 152. It will be seen that when the steam pressure is turned on, the steam rises up through the interior of the insert 127 and forces the nozzle plug member 142 off from the seat 130, thereby opening up the nozzle outlet opening 131. The inverted cup 152 and piston 151 coact to give a dash pot action. The piston 151 may be provided with annular grooves which provide a labyrinth-type seal which increases the dash pot effect.

The outlet fixture or connection 92 is provided with an integrally formed side arm portion 163 which has an internally threaded outlet connection 164 in the top into which is screwed the bottom end of the nipple 91 leading to the four-way fitting 90. The fitting 90 has a thermometer 165 connected to one side thereof so as to measure the temperature of the pasted starch slurry as it is discharged from the cooker.

If desired, the steam pressure on the inlet side of the cooker 125 may be measured by means of a pressure gauge 166 which is connected to the interior of the chamber 132 by means of an elbow member 167 screwed into an opening provided therefor in the rear side of the cooker body 125.

Operation

The system for slurrying and continuously pasting or cooking starch described above in connection with the accompanying drawings is particularly useful and adapted for operation in conjunction with a paper-making machine—either a Fourdrinier type machine or a cylinder type machine.

The slurry tank 5 is first loaded with water and dry starch. The meter valve 8 is pre-set so as to deliver the proper increment of water each time it is tripped when a bag of starch, or other standard quantity of starch, is added into the tank. The system is so designed that the concentration of the starch slurry within the tank 5 is intentionally high and in the range of 2 to 3 pounds of starch per gallon, 2.5 pounds per gallon being a desirable concentration. Only a few minutes are required to load the slurry tank 5 and slurry can be commenced to be drawn off before the tank is completely loaded, if it is desired to save time. For example, if the slurry tank 5 has a thousand gallon capacity, slurry can be drawn off as soon as the level of the mixture is safely above the strainer outlet 13. The additional loading of the tank will not disturb the uniformity of the slurry already in the tank. A thousand gallon tank can be loaded to half capacity by one man in 15 to 20 minutes.

The control panel unit 30 is preferably started up on water only and the concentrated slurry is admitted later. The flow regulating valves 63 and 77 will be first pre-set so as to deliver the desired volume of diluted starch slurry, having the desired ratio of starch to water, into the continuous steam cooker 80. The thermostat 87 will also be set at the desired cooking temperature. After these settings are first made or checked, the valve 72 in the water supply line and the valve 36 in the steam line 35 are opened. Since no starch slurry is being delivered, the differential pressure flow control valve 71 will operate, as described above, to supply water at a rate equal to the full setting of the flow regulating valve 77, e.g. 10 gallons per minute. This stream of diluting water will come into the cooker 80 and will form into a thin annular stream as it passes through the opening passageway 140 leading into the nozzle member 133. The passageway 140 may have a width of approximately thirty thousandths of an inch for example. Steam flows into the lower compartment 132 of the cooker body and passes up through the Venturi passageway in the insert 127 and forms a radially expanding cone-shaped jet as it discharges through the nozzle passageway between the surface 130 and the opposing conical surface of the nozzle plug 142. The width of this passageway may be adjusted to between fifteen to forty thousandths of an inch. As the steam comes in, it lifts the nozzle plug 142 from its seated position on the conical surface 130 and will maintain the nozzle plug 142 in a raised position against the bottom end of the regulating stem 156.

The setting of the stem 156 determines the quantity of steam admitted into the continuous cooker 80 for any particular steam pressure. This setting of the stem 156 will depend mainly upon the degree or extent to which it is desired to paste or cook the starch, greater amounts of steam being required to cook either larger quantities of starch slurry or cook the starch slurry to higher temperatures.

In starting up the system when only water is being passed through the cooker 80, the steam will heat the water thereby bringing the temperature of the equipment up to operating conditions so that when the concentrated starch slurry is turned on the stream, it will be immediately pasted to the desired degree and will not have to be discarded.

During the start-up of the system, the hot water will be added to the white water and furnish and delivered to the paper machine. When everything is in readiness, the operator opens the valve 53 in the concentrated starch slurry line 27, thereby admitting concentrated starch slurry. It will be understood that before the valve 53 is opened, the pump 17 will already have been started and the starch slurry temporarily by-passed through the pressure relief valve 33 and returned to the tank 5.

As the concentrated starch slurry passes through the starch regulator valve 61 and discharges from the concentrated starch slurry flow control valve 63 into the cross-fitting 64, the quantity of water passed through the water regulator 71 will be automatically reduced proportionately, as described above in connection with Figs. 3 and 5. The desired volume of the starch slurry diluted to the desired concentration (e.g. ½ lb. or less starch per gallon) will now be delivered into the jet cooker 80. As this dilute starch slurry leaves the sleeve-shaped or annular passageway 40, it is impinged or struck from the interior by the high velocity, conical-shaped, radially expanding jet of steam and all of the individual starch granules are instantaneously acted upon by the steam.

Because of the fact that all of the starch cells or granules are well dispersed due to the dilute condition of the starch slurry, and because of the fact that all of the starch granules or cells are individually reached and acted upon by the steam to the same extent, it is possible to paste or cook the starch to a very selective degree and with a very high uniformity, as described in detail in my co-pending application Serial No. 337,860. Since the starch slurry passes through the cooker 80 in such a short time (i.e. a fraction of a second), and is then immediately discharged into the paper machine, the cooked starch is cooled or quenched immediately and there is practically no retention time and hence no opportunity for retrogradation. The entire heat cycle is only about 10 seconds, generally.

The continuous cooking system described above has been successfully tested, not only in numerous experimental and preliminary test runs, but also in regular production runs. It has been established that the invention does not merely amount to just another apparatus and method of introducing starch into paper. On the contrary, it has been made evident from the successful tests and actual usage that the invention permits starch to be introduced in the paper-making process in a much more convenient and efficient manner than heretofore and that unexpectedly new and different results are obtained.

Insofar as I am aware, the continuous cooking system of this invention is the first successful means for continuously introducing starch into the paper-making process at a point where it is quickly effective (i.e. downstream of the refining equipment, such as into the head box of a Fourdrinier machine) and in a manner susceptible of immediate control of both quality and quantity. Previous attempts to do this failed for one or more reasons, principally the following:

(a) The appearance of starch flecks and specks in the sheet indicating unsatisfactory mixing and dispersion of the starch paste throughout the stock.

(b) Lack of uniformity and controllability of the paste cooking, producing corresponding variations over a wide range in the paper-machine operation.

(c) Lack of suitable equipment to cook and add starch with simplicity of operating control.

One of the outstanding features of the invention is that it provides a system which is not only capable of operating steadily for long periods to deliver a stream of starch paste which is very uniform with respect to quantity and quality, but it is also very flexible and sensitive so that, when called upon, the quality and/or quantity of the starch can be controllably varied over a wide range. The steady and uniform output inherent with the present system is essential for long-run, high-volume paper-machine operation. On the other hand, the potential sensitivity, wide range and flexibility inherent with the present system are useful and frequently required in order to achieve a successful operation or an improved operation.

As explained above, the system of this invention involves essentially only two controls, i.e. (1) quality and (2) quantity. The quality of the paste is determined by regulating the cooking jet temperature by the thermostatic unit 87, for example, which can be manually set to any desired temperature. The quantity of the starch is determined by regulating the flow control valve 63, for example. One or both of these controls can be used as circumstances demand.

With regard to the sensitivity, flexibility and wide-range characteristics of the system, it is known that there is a wide range of properties between a raw starch mixture and what may be considered reasonably well cooked paste. Most of the properties of the intermediately cooked paste, which properties may be unique and very useful, have had no commercial use because with batch cooking it is too difficult to heat, cook, cool and use the paste with sufficient control accuracy to produce reliable and consistent results. While various other means for continuously cooking starch may have been previously proposed, none has had sufficient sensitivity, flexibility, and range of operation to adequately meet the requirements of a paper-making machine. By contrast, starch in a dilute condition may be cooked to any desired degree in the jet cooker 80, for example. By automatic temperature control, the jet cooker can be made to produce the full range of paste properties, from slight, to intermediate, to well-cooked, with a high degree of uniformity and reliability.

Another important feature of the system of this invention is the ability to make therewith a starch paste of such low solids concentration as would be impractical by batch cooking methods. It has been found that when the paste is added to the head box circuit for example, at a low concentration, e.g. ½ lb. or less starch per gallon, there is complete and uniform dispersion without the formation of starch flecks or fish eyes, even though the paste is chilled when it meets the much larger and relatively cool stream of white water. In contrast, it is known and expected that when a hot, concentrated paste of pearl or unmodified starch is suddenly chilled, a so-called set back or gel is formed which is not completely dispersible and results in fish eyes or starch flecks when applied to a paper machine.

Not only does the present system provide a greatly improved means for introducing the starch into the paper-machine operation, but it also provides a new means of controlling the operation in whole or in part. Heretofore, when cooked starch was introduced into the beaters, the variations that might occur in the starch cooking became lost in the general stock quality of the beater system, and were not readily noticed as variations in the paper-machine operation. However, when the paste is added downstream from the refining equipment, e.g. in the head box input, the variations in paste properties may definitely be noticeable and reflected as variations in machine operation. Specifically, it has been found that the over-all effects of applying the system of this invention depends upon and cannot be divorced from other factors and conditions, such as the nature of the furnish, freeness of stock, type and condition of the paper-making machine and type of paper being made. Therefore, the results obtained can be best expressed in terms of broad boundaries of operating conditions. On the basis of substantial experience, it has been found that the following tendencies or results can be expected when the system of the present invention is used in connection with a paper-making operation:

(1) Starch retention is substantially increased with gains up to as much as 100% in certain instances.

(2) Unmodified starch may be advantageously substituted for the special modified beater starches normally employed.

(3) The retention of fine stock and clays is increased. In certain instances the increase was such that corrective weight adjustment had to be made in order to compensate for the extra retention.

(4) There is an increase in density, Mullen value and Pick test. The tendency toward such increases may be offset to some extent where there is a high gain in retention of fine stock and clays. One test on a free stock having low clay and fine stock resulted in a Mullen gain of 20%.

(5) The wide control range of which the system is capable allows the selection of the optimum paste quality for any grade of paper being made. What is more, the quality of the paper may even be controlled by controlling the quality and quantity of the starch paste.

(6) The optimum paste quality for many grades of paper has been found to lie in or correspond to the intermediate cooking temperature range. Such paste quality was not previously available to the paper maker.

(7) Apparent stock freeness, as indicated by suction pressures at vacuum boxes and rolls, is related to starch cooking temperature. Thus, a five degree temperature rise in the continuous cooker 80 may produce from one inch to two inch increase in vacuum.

(8) Significant changes in either quantity or quality of the starch paste have an immediate response on the paper machine. The delay time for a control change is only the time required for stock to pass through the head box and through the machine.

(9) The same starch input can be maintained by adjustment of the cooking temperature. For example, if the suction at the head box increases too much when the continuous starch stream is introduced, the suction can be reduced by lowering the temperature without changing the quantity or flow rate of the starch.

(10) Because of the relationship which exists between the cooking temperature of the continuous jet cooker and the refining power, the jet temperature can be used for purposes of control instead of varying the refining power. As mentioned above, changes in starch cooking temperature are quickly reflected on the paper machine. Changes in refining power are not reflected until after considerable delay.

It will be seen, therefore, that the system of the present invention is useful not merely for the purpose of serving as an efficient and convenient means for introducing starch into the paper-making operation, but also as a means of adding another degree of freedom or control in the paper-making process through the regulation of apparent stock freeness on the paper machine without changing the stock preparation.

It will be appreciated that certain modifications and changes may be made in the foregoing system shown and described in connection with Figs. 1-6 of the drawings. For example, the concentrated large starch slurry tank 5 may be located at or near the beater room so that the filling of the tank may be the assigned duty of the beater room personnel. It may be practical to locate the starch slurry tank 5 on an upper floor or at an elevated level, sufficiently above the control panel 30 so that the concentrated starch slurry pump 17 may be eliminated and the starch slurry fed by gravity to the control unit 30.

If desired, white water from the paper-making operation may be used as a diluting water supply for the control unit 30.

While corn starch will normally be used in the system, any similar amylaceous material may be used such, for example, as other varieties of starch and locust bean gum. Therefore, it will be understood that the invention is not limited to use with any particular type of starch but is useful for other amylaceous materials.

The starch slurrying and pasting system may be used not only in connection with a paper-making machine but also for other purposes where it is desired to have a controllable supply of uniformly pasted starch slurry. For example, the system may be used in the manufacture of textiles. For that purpose, the concentration of the starch slurry will usually be higher than that used for paper-making. Also, the cooking temperatures will usually be higher when the system is used in connection with textiles.

The continuous steam jet cooker 80 may be replaced by the cooker disclosed in my copending application Serial No. 337,860. It may also be replaced by the continuous steam jet cooker indicated at 170 in Fig. 7 of the drawings.

The cooker 170 comprises a body 171 in the form of a casting of the type in common use for globe valves. The body 171 is partitioned on the interior into an upper chamber 172 communicating with a starch slurry inlet connection 173, and a bottom chamber 174 communicating with the cooked paste outlet connection 175. An integrally cast partition or baffle 176 separates the chambers 172 and 174 and is provided in the central horizontal portion with a threaded valve port 177 which communicates between the two chambers. The casting or body 171 also has an interiorly threaded port 178 at the top which opens into the upper chamber 172. At the bottom it has a corresponding interiorly threaded port 180 into the bottom of the lower chamber 174.

An insert indicated generally at 181 projects into the lower chamber 174, which serves as the means for introducing steam into the cooker 170. The insert 181 has an enlarged bottom portion 182 which is exteriorly threaded and screwed into the port 180. It carries an integrally formed head 183 on the bottom and the top is joined by an intermediate frusto-conical portion 184 to a tubular extension 185 which terminates at the upper end into a restricted discharge opening 186. The insert member 181 has a central opening 187 extending therethrough by which steam may be introduced through the insert 181 into the cooker 170.

The tubular extension 185 on the insert 181 cooperates with a separate member 188 to form therewith a steam nozzle. The bottom surface of the member 188 is recessed in the form of a cone as indicated at 190 and this conical surface cooperates within the frusto-conical surface 191 on the upper end of the projection 185 so as to provide therebetween a conically-shaped nozzle outlet designated at 192.

The member 188, which may be considered as a nozzle cap, is supported by a vertically extending stem 193 which projects upwardly through an adapter member 194 which is screwed into the top port 178 of the valve body 171. The stem 193 projects through a smooth central opening provided therefor in the insert 194. The upper end of this opening is enlarged and tapped as indicated at 195 for receiving an exteriorly threaded adjusting plug 196. The top surface of the plug 196 is provided with a cross slot 197 so that a screw driver may be used to turn the plug 196 in the threaded hole 195. The bottom of the plug 196 limits the upward movement of the stem 193 and may thereby be used to adjust the width of the nozzle opening or gap 192. If desired, the adjusting plug 196 may be omitted and the stem 193 connected to a suitable control means of known type which will automatically regulate the width of the nozzle opening 192.

The steam nozzle provided by the extension 185 on the insert 181 and the nozzle cap 188 is surrounded by a sleeve or flow tube 198 which is exteriorly threaded adjacent the center portion so as to screw into the interiorly threaded valve port 177 in the baffle or partition 176. It will be seen that the flow tube 198 projects substantially into the lower valve compartment 174 as well as into the upper compartment 172. The upper projection of the tubular member 198 has increased thickness so as to provide a shoulder which seats on the top of the valve port. The top entrance in the flow tube 198 preferably is rounded or flared as indicated at 200.

It will be seen that the operation of the jet cooker 170 corresponds, generally, to the mode of operation of the continuous cooker 80. The starch slurry enters through the connection 173 into the upper valve chamber 172 and flows downwardly in the form of an annular or sleeve-shaped stream between the interior of the flow tube 198 and the exterior surfaces of the nozzle cap 188 and the tubular extension 185. Steam coming in through the insert 181 issues from the nozzle opening 186 and strikes against the center of the conical surface 190 of the nozzle cap 18 and is deflected downwardly through the nozzle opening 192. At the periphery of the opening 192 the conically shaped jet of steam, which is now at a high velocity and relatively low pressure, strikes the thin annular stream of starch from the interior and produces the practically instantaneous cooking or pasting action of the starch, mentioned above in connection with the starch cooker 80. As in the case of the cooker 80, this cooking action is extremely uniform since for all practical purposes each individual particle of starch is reached by the steam and subjected to the same degree of treatment. The cooked starch issues from the bottom end of the flow tube 198 and then flows out of the cooker through the discharge connection 175. It will be seen that with minor changes in the piping connections, the cooker 170 may be substituted in place of the continuous cooker 80 in the control panel unit 30 described above in connection with Fig. 2 of the drawings.

The design of the cooker 170 is particularly advantageous in that it provides for a high degree of rigidity which easily resists and handles the substantial stresses that may potentially be set up within it. All of the parts are rigidly supported and maintained in the proper alignment. In particular, the design is capable of resisting the severe mechanical vibration which could take place in a rotary direction in a plane perpendicular to the principal axis of the nozzle, i.e. a horizontal plane as shown in Fig. 7. In addition, the cooker design 170 is advantageous because of its simplicity and ease of manufacture and assembly of its component parts.

Referring to Fig. 8 a recirculatory type system is shown for delivering the concentrated starch slurry to the panel 30. In place of a single delivery line between the pump 17 and the panel 30 there is in this system a looped or double line comprising branches 201 and 202 communicating between the upper end of T 31 and the line 32 leading from T 31 to the pressure relief valve 33. The branches 201 and 202 are joined by a T 203, the side port of which is connected to the panel 30 by the connection 204. The advantage of this recirculatory system is that it permits a relatively large volume of the starch slurry to circulate through the branches 201 and 202 even though only a small amount may be taken in by the panel unit 30. The continuous circulation prevents the starch from settling out and plugging up the delivery lines. This is a difficulty that may be encountered in a single line delivery system when the flow is at times very small.

Having fully described my invention and illustrative embodiments thereof, together with the mode of operation, and having indicated certain additional modifications and changes that may be made without departing from the spirit and scope of the invention, what is claimed as new is:

1. The improvement in introducing cooked or pasted starch at the wet end of a paper-making machine which comprises, continuously pasting a stream of starch with a jet of steam in a uniform immediate manner and immediately after pasting introducing the stream of pasted starch into a large volume of aqueous fluid in the wet end of the paper-making machine whereby the starch paste is quickly cooled and the cooking or pasting action quenched.

2. The improvement called for in claim 1 wherein said stream of pasted or cooked starch is introduced into the white water return system.

3. The improvement called for in claim 1 wherein said stream of starch does not contain more than about 1 pound of starch per gallon.

4. The improvement called for in claim 1 wherein the degree of pasting is controlled by regulating the temperature.

5. The method of preparing and introducing cooked or pasted starch at the wet end of a paper-making machine which comprises, preparing and maintaining a relatively large body of concentrated starch slurry, continuously blending a stream of water with a stream of said concentrated starch slurry to produce a stream of relatively dilute starch slurry, continuously pasting said stream of dilute starch slurry with a jet of steam in a uniform immediate manner, and immediately introducing the resulting stream of pasted starch directly into a relatively cool and large volume of aqueous fluid in the wet end of the paper-making machine.

6. The method called for in claim 5 wherein the stream of dilute starch slurry is pasted or cooked at a temperature substantially below that at which the starch would be fully pasted or cooked.

7. The method of preparing and introducing cooked or pasted starch at the wet end of a paper-making machine which comprises, preparing and maintaining a relatively large body of concentrated starch slurry containing at least about 2 pounds of starch per gallon, continuously blending a stream of water with a stream of said concentrated starch slurry to produce a stream of relatively dilute starch slurry containing not more than about 1 pound of starch per gallon, continuously pasting said stream of dilute starch slurry with a jet of steam in a uniform immediate manner, and immediately introducing the resulting stream of pasted starch directly into a relatively cool and large volume of aqueous liquid in the wet end of the paper-making machine.

References Cited in the file of this patent

UNITED STATES PATENTS

| | | |
|---|---|---|
| 2,147,213 | Pattilloch | Feb. 14, 1939 |
| 2,197,463 | Bradner | Apr. 16, 1940 |
| 2,199,750 | Meincke | May 7, 1940 |
| 2,805,966 | Etheridge | Sept. 10, 1957 |

OTHER REFERENCES

Casey: Pulp and Paper, vol. I, published by Interscience Publication, New York, N.Y., 1952, page 415.

UNITED STATES PATENT OFFICE
CERTIFICATE OF CORRECTION

Patent No. 2,980,576  April 18, 1961

Oliver R. Etheridge

It is hereby certified that error appears in the above numbered patent requiring correction and that the said Letters Patent should read as corrected below.

Column 9, line 71, for "casing" read -- casting --; column 12, line 24, for "40" read -- 140 --; column 16, line 21, for "18" read -- 188 --.

Signed and sealed this 2nd day of January 1962.

(SEAL)
Attest:

ERNEST W. SWIDER
Attesting Officer

DAVID L. LADD
Commissioner of Patents